United States Patent
Hoshino

(10) Patent No.: US 12,194,785 B2
(45) Date of Patent: Jan. 14, 2025

(54) PNEUMATIC TIRE

(71) Applicant: Sumitomo Rubber Industries, Ltd., Kobe (JP)

(72) Inventor: Takafumi Hoshino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 68 days.

(21) Appl. No.: 18/119,447

(22) Filed: Mar. 9, 2023

(65) Prior Publication Data

US 2023/0311584 A1    Oct. 5, 2023

(30) Foreign Application Priority Data

Mar. 31, 2022    (JP) .................................. 2022-060432

(51) Int. Cl.
  *B60C 15/06*    (2006.01)
  *B60C 15/00*    (2006.01)

(52) U.S. Cl.
  CPC .......... *B60C 15/06* (2013.01); *B60C 15/0054* (2013.01); *B60C 15/0607* (2013.01); *B60C 2015/0621* (2013.01)

(58) Field of Classification Search
  CPC . B60C 15/06; B60C 15/0607; B60C 15/0054; B60C 15/0603; B60C 2015/0621; B60C 2015/0614; B60C 2015/0625; B60C 2015/0617
  See application file for complete search history.

(56) References Cited

U.S. PATENT DOCUMENTS

| | | | |
|---|---|---|---|
| 2013/0133806 A1* | 5/2013 | Amano | B60C 15/0018 152/541 |
| 2015/0007916 A1* | 1/2015 | Oba | B60C 11/005 152/209.5 |
| 2016/0114633 A1* | 4/2016 | Miyasaka | B29D 30/48 152/542 |
| 2019/0047332 A1* | 2/2019 | Nakajima | B60C 15/0603 |
| 2019/0193484 A1 | 6/2019 | Kubo | |
| 2020/0189319 A1 | 6/2020 | Kurosawa | |
| 2021/0387484 A1 | 12/2021 | Nishio | |

FOREIGN PATENT DOCUMENTS

| | | | |
|---|---|---|---|
| DE | 11 2019 004 940 T5 | 6/2021 | |
| EP | 3 012 123 A1 | 4/2016 | |
| EP | 4140771 A1 * | 3/2023 | ......... B60C 11/0041 |
| JP | 2005112042 A * | 4/2005 | |
| JP | 2020-93755 A | 6/2020 | |

OTHER PUBLICATIONS

Extended European Search Report for European Application No. 23158963.1, dated Jul. 27, 2023.

* cited by examiner

*Primary Examiner* — Cedrick S Williams
*Assistant Examiner* — Thomas Frank Schneider
(74) *Attorney, Agent, or Firm* — Birch, Stewart, Kolasch & Birch, LLP

(57) ABSTRACT

A pneumatic tire 1 has a bead portion provided with a reinforcing rubber portion disposed adjacently to the axially outer side of a carcass. The reinforcing rubber portion comprises an axially inner rubber layer and an axially outer rubber layer. The radially outer end of the axially outer rubber layer is positioned radially outside the radially outer end of the axially inner rubber layer. The radially inner end of the axially outer rubber layer is positioned radially inside the radially inner end of the axially inner rubber layer.

20 Claims, 3 Drawing Sheets

PNEUMATIC TIRE

BACKGROUND OF THE INVENTION

Field of the Invention

The present disclosure relates to a pneumatic tire.

Background Art

Patent document 1 listed below discloses a pneumatic tire in which each bead portion is provided with a main bead apex rubber extending from the radially outer surface of the bead core, and an outer bead apex rubber disposed axially outside the main bead apex rubber. This pneumatic tire is explained as being improved in durability performance.
Patent Document 1: Japanese Patent Application Publication No. JP2020-093755A

SUMMARY OF THE INVENTION

Problems to be Solved by the Invention

In recent years, there has been a demand to further improve the durability performance of the bead portions (hereinafter referred to as "bead durability performance"). In particular, such a demand is high in pneumatic tires for small trucks liable to be subjected to heavy loads.

The present disclosure was made in view of the situation as described above, and a primary object of the present disclosure is to provide a pneumatic tire in which the bead durability performance is further improved.

Means for Solving the Problems

According to the present disclosure, a pneumatic tire comprises: a pair of bead portions each with a bead core embedded therein; and a carcass extending between the bead portions, the carcass comprising a carcass ply extending between the bead portions and turned up around the bead core in each bead portion from the axially inside to the axially outside so as to form a pair of turnup portions extending radially outwardly, and a main portion therebetween, wherein one of or each of the bead portions is provided with a reinforcing rubber portion disposed adjacently to the axially outer side of the turnup portion, the reinforcing rubber portion includes an axially inner rubber layer, and an axially outer rubber layer which is adjacent to the axially outer side of the axially inner rubber layer, the radially outer end of the axially outer rubber layer is positioned radially outside the radially outer end of the axially inner rubber layer, and the radially inner end of the axially outer rubber layer is positioned radially inside the radially inner end of the axially inner rubber layer.

Effects of the Invention

In the pneumatic tire according to the present disclosure, by adopting the above configuration, the bead durability performance is further improved.

DETAILED DESCRIPTION OF THE INVENTION

An embodiment of the present disclosure will now be described in detail in conjunction with accompanying drawings.

Figure 1:
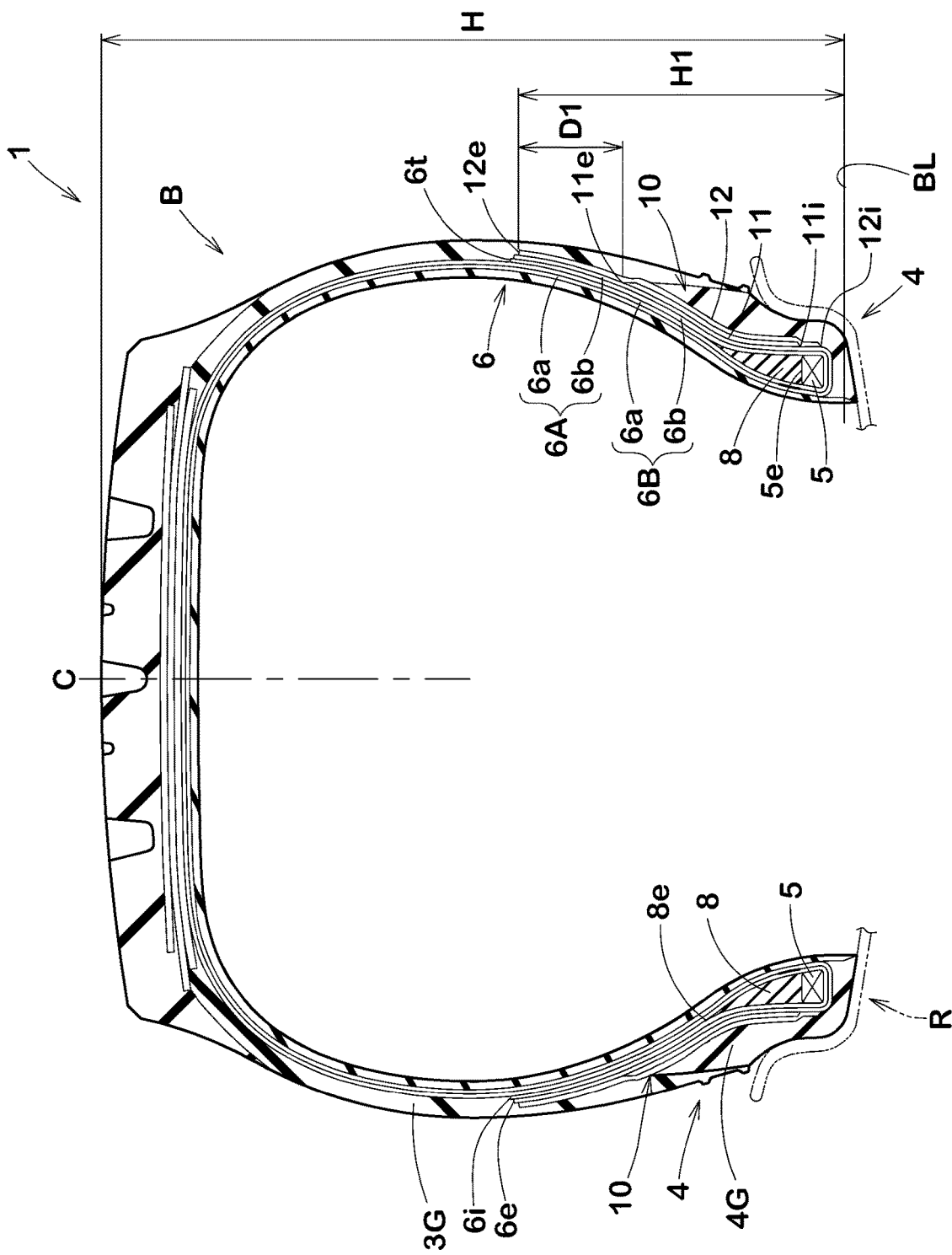
FIG. 1 is a meridian cross-sectional view of a pneumatic tire as an embodiment of the present disclosure.

FIG. 1 is a meridian cross-sectional view of a pneumatic tire 1 as an embodiment of the present disclosure under its normal state.

The present disclosure can be applied to tires for light trucks (including commercial vehicles).

Further, the present disclosure may be applied to tires for passenger cars and heavy duty vehicles such as trucks and buses.

Here, the normal state is a no-load state in which the tire is mounted on a regular rim R and inflated to a standard pressure.

In this application including the description and claims, dimensions, positions and the like relating to the tire are refer to those under the normal state unless otherwise noted.

The regular rim R is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. For example, the regular rim is the "standard rim" specified in JATMA, the "Measuring Rim" in ETRTO, the "Design Rim" in TRA or the like.

The standard pressure is the maximum air pressure for the tire specified by the same organization in the Air-pressure/Maximum-load Table or similar list.

For example, the standard pressure is the "maximum air pressure" in JATMA, the "Inflation Pressure" in ETRTO, the maximum pressure given in the "Tire Load Limits at Various Cold Inflation Pressures" table in TRA or the like.

As shown in FIG. 1, the tire 1 comprises a pair of bead portions 4 each with a bead core 5 embedded therein, and a carcass 6 extending between the bead portions 4.

The carcass 6 comprises at least one carcass ply (6A, 6B) extending between the bead portions 4 through a tread portion 2 and sidewall portions 3, and turned up around the bead core 5 in each bead portion 4 from the axially inside to the axially outside so as to form a pair of turnup portions 6b extending radially outwardly and a main portion 6a therebetween.

In the present embodiment, the carcass 6 is composed of two carcass plies 6A and 6B arranged radially inside and outside in the tread portion 2.

The radially outer end 6e of the turnup portion 6b of the inner carcass ply 6A is positioned radially inside the radially outer end 6i of the turnup portion 6b of the outer carcass ply 6B.

The carcass 6 may be composed of only one carcass ply 6A.

One of or each of the bead portions 4 is provided with a reinforcing rubber portion 10 adjacent to the axially outer side of the axially outer turnup portion 6b.

The reinforcing rubber portion 10 is to enhance the rigidity of the bead portion 4, suppress deflection during running and improve bead durability performance.

In the present embodiment, the reinforcing rubber portion 10 is disposed in each of the bead portions 4.

The reinforcing rubber portion 10 is disposed on the axially outer side of the turnup portion 6b of the inner carcass ply 6A.

The reinforcing rubber portion 10 is composed of an axially inner rubber layer 11 and an axially outer rubber layer 12 which is disposed on the axially outer side of the axially inner rubber layer 11.

The reinforcing rubber portion 10 may include one or more intermediate rubber layers (not shown) arranged between the axially inner rubber layer 11 and the axially outer rubber layer 12.

The radially outer end 12e of the axially outer rubber layer 12 is positioned radially outside the radially outer end 11e of the axially inner rubber layer 11.

The radially inner end 12i of the axially outer rubber layer 12 is positioned radially inside the radially inner end 11i of the axially inner rubber layer 11.

Such axially outer rubber layer 12 enhances the rigidity of the bead portion 4, especially the lateral rigidity, thereby improving the bead durability performance.

The axially outer rubber layer 12 prevents contact between a sidewall rubber 3G or a clinch rubber 4G which will be described later, and the axially inner rubber layer 11, so that the number of steps formed by the reinforcing rubber portion 10 and the sidewall rubber 3G or the clinch rubber 4G is decreased to suppress the occurrence of space not filled with rubber.

Therefore, in the tire according to the present disclosure, the bead durability performance can be further improved.

On the radially outer side of the reinforcing rubber portion 10, the two outer ends 11e and 12e come into contact with the carcass ply 6A or 6B. On the radially inner side of the reinforcing rubber portion 10, the two inner ends 11i and 12i come into contact with the carcass ply 6A. Therefore, strain concentration on the carcass ply 6A is relaxed as compared with the case where only the radially outer end 11e and the inner end 11i of the axially inner rubber layer 11 are in contact with the carcass ply 6A (for example, when the length of the axially inner rubber layer 11 is greater than the length of the axially outer rubber layer 12). As a result, the looseness of the carcass ply 6A is suppressed. Therefore, the tire 1 according to the present disclosure is further improved in bead durability performance.

In each of the bead portions 4 in the present embodiment, the bead apex rubber 8, the sidewall rubber 3G, and the clinch rubber 4G are disposed.

The bead apex rubber 8 extends radially outwardly from the bead core 5.

The clinch rubber 4G is disposed axially outside the reinforcing rubber portion 10.

The sidewall rubber 3G is disposed adjacently to the radially outer side of the clinch rubber 4G.

The sidewall rubber 3G and the clinch rubber 4G form a part of the outer surface of the tire 1.

The distance D1 in the tire radial direction between the radially outer end 11e of the axially inner rubber layer 11 and the radially outer end 12e of the axially outer rubber layer 12 is preferably not less than 3 mm.

Thereby, between the radially outer ends 11e and 12e, a certain distance is secured, and the change in rigidity of the bead portion 4 in the tire radial direction is reduced, so the bead durability performance is further improved.

The distance D1 is more preferably not less than 5 mm, but preferably not more than 15 mm, more preferably not more than 10 mm.

From the same point of view, the distance D2 (shown in FIG. 2) in the tire radial direction between the radially inner end 11i of the axially inner rubber layer 11 and the radially inner end 12i of the axially outer rubber layer 12 is preferably not less than 3 mm, more preferably not less than 5 mm, but preferably not more than 10 mm, more preferably not more than 7 mm.

The height H1 from the bead baseline BL to the radially outer end 12e of the axially outer rubber layer 12 is preferably not less than 20%, more preferably not less than 30%, but preferably not more than 50%, more preferably not more than 45% of the tire section height H.

Since the height H1 is not less than 20% of the tire section height H, it is possible to exhibit high lateral rigidity against the load applied during running.

Since the height H1 is not more than 50% of the tire sectional height H, damage at the buttress portion B to which a relatively large load is applied is suppressed.

Here, the tire section height H is the distance in the tire radial direction from the bead base line BL to the radially outermost position of the tread portion 2.

The bead base line BL is a straight line extending parallel to the tire axial direction, passing through the radial position corresponding to the rim diameter determined by the standard (for example, JATMA) on which the tire is based.

In the present embodiment, the radially outer end 12e of the axially outer rubber layer 12 is positioned radially inward of the radially outermost end 6t of the turnup portions 6b.

Thereby, undesirable steps are eliminated, and the occurrence of space not filled with rubber, namely, space filled with air can be suppressed. And sufficient bead durability performance can be ensured.

Figure 2:
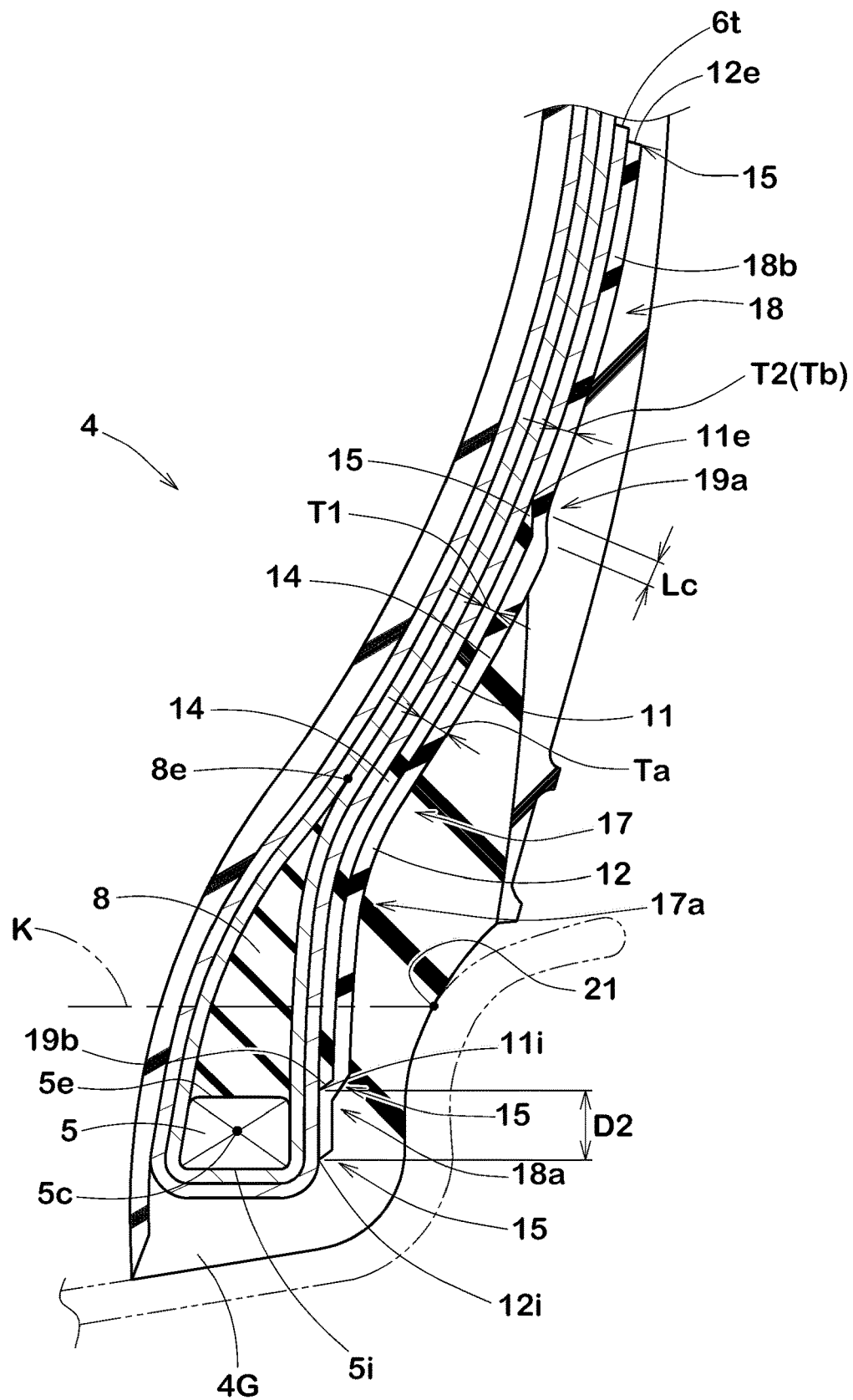
FIG. 2 is an enlarged view of the bead portion of FIG. 1.

FIG. 2 is an enlarged view of the bead portion 4.

In the present embodiment, the radially inner end 12i of the axially outer rubber layer 12 is positioned radially inward of the radially outer end 5e of the bead core 5 as shown in FIG. 2. Thereby, the axially outer rubber layer 12 and the bead core 5 overlap in the tire radial direction, and deformation of the axially outer rubber layer 12 is further suppressed, thereby improving bead durability performance.

The radially inner end 12i of the axially outer rubber layer 12 in this example is positioned radially inside the center 5c in the tire radial direction of the bead core 5.

The radially inner end 12i of the axially outer rubber layer 12 in this example is preferably positioned radially outside the radially inner end 5i of the bead core 5.

Thereby, the fitability with the wheel rim is maintained at a high level, while maintaining the bead durability performance.

The radially inner end 11i of the axially inner rubber layer 11 in this example is positioned radially inward of the radially outer end 8e of the bead apex rubber 8.

As a result, the bead apex rubber 8 and the axially inner rubber layer 11 overlap in the tire radial direction, and deformation of the axially inner rubber layer 11 is suppressed, thereby further improving bead durability performance.

The radially inner end 11i of the axially inner rubber layer 11 is preferably positioned radially outside the radially outer end 5e of the bead core 5.

As a result, the fitability to the wheel rim is maintained at a high level, while maintaining the bead durability performance.

The loss tangent 62 of the axially outer rubber layer 12 is preferably larger than the loss tangent 61 of the axially inner rubber layer 11.

Such axially outer rubber layer 12 has higher rigidity, and exerts an effect of suppressing strain and an effect of improving lateral rigidity.

Since the axially inner rubber layer 11 has a smaller hysteresis loss than the axially outer rubber layer 12, the amount of heat generated is suppressed.

As a result, the axially inner rubber layer 11 suppresses the heat of the axially outer rubber layer 12 from being transferred to the carcass ply 6A, and the separation between the axially inner rubber layer 11 and the carcass ply 6A is suppressed. Therefore, the bead durability performance is greatly improved.

In order to effectively derive such advantageous effect, the loss tangent 62 of the axially outer rubber layer 12 is preferably 0.07 or more, more preferably 0.12 or more, but preferably 0.20 or less, more preferably 0.18 or less.

The loss tangent 61 of the axially inner rubber layer 11 is preferably not less than 50%, more preferably not less than 55%, but preferably not more than 70%, more preferably not more than 65% of the loss tangent 62 of the axially outer rubber layer 12, In this specification, the loss tangent δ and the complex elastic modulus E* described later are measured using a dynamic viscoelasticity measuring device (Iplexer series manufactured by GABO) under the following conditions in accordance with the provisions of JIS-K6394 "Rubber, vulcanized or thermoplastic—Determination of dynamic properties—General guidance".

Initial strain: 10%
Dynamic strain amplitude: +/−2%
Frequency: 10 Hz
Deformation mode: Stretch
Measurement temperature: 70 deg. C The complex elastic modulus $E^*2$ of the axially outer rubber layer 12 is preferably not less than 120% of the complex elastic modulus $E^*1$ of the axially inner rubber layer 11.

As a result, the lateral rigidity of the axially outer rubber layer 12 disposed on the outer side in the tire axial direction is maintained high, and deformation under high load conditions is suppressed, thereby improving bead durability performance.

If the complex elastic modulus $E^*2$ of the axially outer rubber layer 12 is excessively larger than the complex elastic modulus $E^*1$ of the axially inner rubber layer 11, then the stepped rigidity change at the radially outer end 12e and the radially inner end 12i of the axially outer rubber layer 12 becomes large.

Thus, there is a possibility that the bead durability performance may deteriorate.

For this reason, the complex elastic modulus $E^*2$ of the axially outer rubber layer 12 is preferably larger than the complex elastic modulus $E^*1$ of the axially inner rubber layer 11, and the complex elastic modulus $E^*2$ is preferably not more than 200%, more preferably not more than 190% of the complex elastic modulus $E^*1$.

Although not particularly limited, the complex elastic modulus $E^*2$ of the axially outer rubber layer 12 is preferably 40 MPa or more, more preferably 50 MPa or more, but preferably 150 MPa or less, more preferably 120 MPa or less.

Preferably, the adhesive force f2 of the axially outer rubber layer 12 is not less than 1.3 times the adhesive force f1 of the axially inner rubber layer 11.

Such axially outer rubber layer 12 has high adhesiveness to the sidewall rubber 3G or the clinch rubber 4G, and helps to improve the bead durability performance.

Although not particularly limited, the adhesive force f2 of the axially outer rubber layer 12 is more preferably not less than 1.4 times, but preferably not more than 2.0 times, more preferably not more than 1.8 times the adhesive force f1 of the axially inner rubber layer 11.

The adhesive force f2 of the axially outer rubber layer 12 is preferably not less than 150N, more preferably not less than 180N.

Although not particularly limited, considering the attachment work of the axially outer rubber layer 12, the adhesive force f2 is preferably not more than 350N, more preferably not more than 300N.

The adhesive force is of the rubber layers 11 and 12 in the state before vulcanization (namely, sheet-shaped rubber members described later), and is measured under the following conditions, using a PICMA tack tester manufactured by Toyo Seiki Co., Ltd.

Load for pressure bonding: 4.9 N
Pressurizing time: 30 seconds
Peeling speed: 15 mm/min
Temperature: 20 degrees C.
Humidity: 55%

Figure 3:
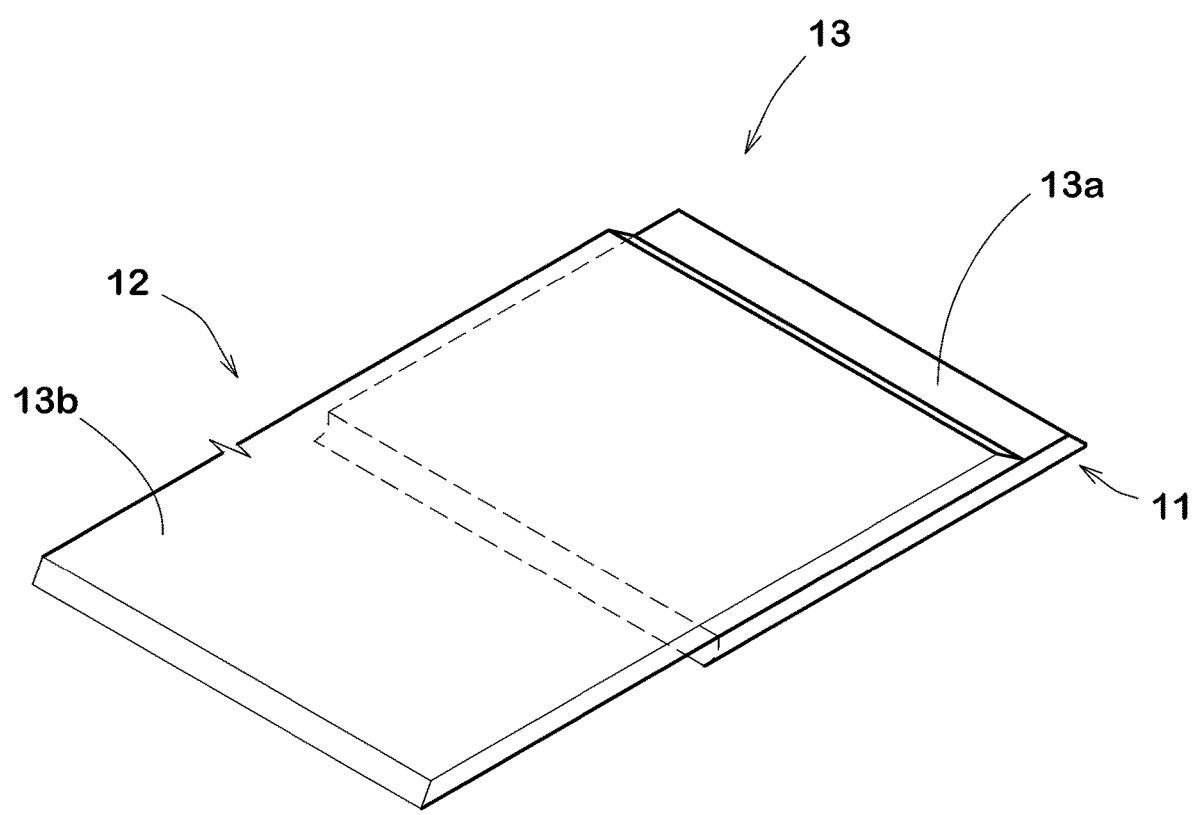
FIG. 3 is a perspective view of sheet-shaped rubber members.

Each of the axially inner rubber layer 11 and the axially outer rubber layer 12 is made of a sheet-shaped rubber member 13 (shown in FIG. 3).

The sheet-shaped rubber member 13 is obtained, for example, by cutting a raw rubber sheet (not shown) extruded by a rubber extruder.

Such sheet-shaped rubber member 13 facilitates the production of the reinforcing rubber portion 10 for various tire sizes and enhances its versatility.

FIG. 3 is a perspective view of each sheet-shaped rubber member 13.

As shown in FIG. 3, in the present embodiment, the sheet-shaped rubber member 13 includes a first sheet-shaped rubber member 13a for forming the axially inner rubber layer 11 and a second sheet-shaped rubber member 13b for forming the axially outer rubber layer 12.

In the present embodiment, the reinforcing rubber portion 10 is formed by laminating these sheet-shaped rubber members 13a and 13b in the tire axial direction.

Each sheet-shaped rubber member 13 is vulcanized to form the axially inner rubber layer 11 and the axially outer rubber layer 12.

As shown in FIG. 2, the axially inner rubber layer 11 has a constant-thickness portion 14 having a constant thickness, and reduced-thickness portions 15 whose thickness decreases toward its radially inner end 11i and radially outer end 11e, and the axially outer rubber layer 12 has a constant-thickness portion 14 having a constant thickness, and reduced-thickness portions 15 whose thickness decreases toward its radially inner end 12i and its radially outer end 12e.

The reduced-thickness portion 15 serves to alleviate the stepped rigidity difference and improve the bead durability performance.

Here, the constant-thickness portion is a portion where the thickness variation is at most 0.2 mm per 1 mm length along the longitudinal direction (tire radial direction) of the axially inner rubber layer 11 and the axially outer rubber layer 12.

For example, the length Lc of each reduced-thickness portion 15 is preferably not more than 5 mm, more preferably not more than 3 mm.

The reinforcing rubber portion 10 have a first portion 17 where the two sheet-shaped rubber members 13 are laminated, and a second portion 18 where the two sheet-shaped rubber members 13 are not laminated (namely, a portion 18 is formed by only one sheet-shaped rubber member 13).

In the present embodiment, the first portion 17 is composed of the axially inner rubber layer 11 and the axially outer rubber layer 12 which are laminated.

In the present embodiment, the second portion 18 is composed of only the axially outer rubber layer 12.

The second portion 18 comprises an inner second portion 18a extending radially inwardly from the radially inner end 11i of the axially inner rubber layer 11, and an outer second portion 18b extending radially outwardly from the radially outer end 11e of the axially inner rubber layer 11.

In the present embodiment, the first portion 17 is positioned between the inner second portion 18a and the outer second portion 18b.

The first portion 17 includes a maximum thickness portion 17a.

The maximum thickness portion 17a is formed by overlapping the constant-thickness portion 14 of the axially inner rubber layer 11 and the constant-thickness portion 14 of the axially outer rubber layer 12.

The maximum thickness portion 17a does not include
the portion 19a where the reduced-thickness portion 15 of the axially inner rubber layer 11 including the radially outer end 11e and the constant-thickness portion 14 of the axially outer rubber layer 12 overlap, and
the portion 19b where the reduced-thickness portion 15 of the axially inner rubber layer 11 including the radially inner end 11i and the constant-thickness portion 14 of the axially outer rubber layer 12 overlap.

It is preferable that the first portion 17 is positioned across a straight line K, which is drawn parallel to the tire axial direction, passing through the radially outer end 21 of the contact area between the tire 1 and the regular rim R under the normal state of the tire.

The vicinity of the radially outer end 21 is a portion to which a large bending load acts while the vehicle is running.

By disposing the first portion 17 in the same position in the tire radial direction as the radially outer end 21, deformation at the radially outer end 21 is suppressed, and the bead durability performance is further improved.

In order to derive this effect more effectively, it is preferred that the maximum thickness portion 17a is positioned across the straight line K.

The difference (Ta−Tb) between the thickness Ta of the first portion 17 and the thickness Tb of the second portion 18 is preferably 1 mm or more.

Since the difference (Ta−Tb) is 1 mm or more, the rigidity of the first portion 17 is increased and the durability is improved.

If the difference (Ta−Tb) is excessively large, the rigidity of the first portion 17 becomes too large, and there is a possibility that ride comfort performance is deteriorated.

From this point of view, the difference (Ta−Tb) is preferably 3.5 mm or less, more preferably 3.0 mm or less.

The thickness Ta of the first portion 17 is the thickness of the maximum thickness portion 17a.

The thickness Tb of the second portion 18 is the thickness T2 of the constant-thickness portion 14 of the axially outer rubber layer 12.

In order to effectively derive the above effects, the thickness Ta of the first portion 17 is preferably not less than 1.5 times, more preferably not less than 1.8 times, but preferably not more than 2.5 times, more preferably not more than 2.3 times the thickness Tb of the second portion 18.

The thickness T2 of the constant-thickness portion 14 of the axially outer rubber layer 12 is preferably larger than the thickness T1 of the constant-thickness portion 14 of the axially inner rubber layer 11.

As a result, the reinforcing rubber portion 10 can suppress the occurrence of bareness of rubber, while ensuring sufficient durability, so the appearance of the tire can be improved.

Although not particularly limited, the thickness T2 of the axially outer rubber layer 12 is preferably not less than 120%, more preferably not less than 150%, but preferably not more than 350%, more preferably not more than 300% of the thickness T1 of the axially inner rubber layer 11.

The thickness T2 of the axially outer rubber layer 12 is preferably 0.5 mm or more, more preferably 0.8 mm or more, but preferably 2.0 mm or less, more preferably 1.5 mm or less. When the thickness T2 of the constant-thickness portion 14 of the axially outer rubber layer 12 is the same as the thickness T1 of the constant-thickness portion 14 of the axially inner rubber layer 11, the axially inner rubber layer 11 and the axially outer rubber layer 12 may be manufactured by cutting one sheet of the sheet-shaped rubber member 13.

The bead apex rubber 8 in this example has a triangular shape in the meridian cross section of the tire.

Although not particularly limited, at a radial position corresponding to the radial height of the radially outer end 8e of the bead apex rubber 8, both the axially inner rubber layer 11 and the axially outer rubber layer 12 exist.

In the present embodiment, at the radial position corresponding to the radial height of the radially outer end 8e of the bead apex rubber 8, the maximum thickness portion 17a exists.

The complex elastic modulus $E^*3$ of the bead apex rubber 8 is preferably equal to the complex elastic modulus $E^*1$ of the axially inner rubber layer 11, for example.

The complex elastic modulus $E^*3$ of the bead apex rubber 8 is preferably smaller than the complex elastic modulus $E^*2$ of the axially outer rubber layer 12, for example.

As shown in FIG. 1, the complex elastic modulus $E^*$ of the sidewall rubber 3G and the clinch rubber 4G are both smaller than the complex elastic modulus $E^*1$ of the axially inner rubber layer 11. As a result, basic ride comfort performance is provided.

While detailed description has been made of a preferable embodiment of the present disclosure, the present disclosure can be embodied in various forms without being limited to the illustrated embodiment.

Comparison Tests

Based on the structure shown in FIG. 1, pneumatic tires were experimentally manufactured as test tires (Comparative examples Ref.1-Ref.4 and Examples Ex.1-Ex.5 according to the present disclosed) and tested for the bead durability performance and appearance.

Specifications of the test tires are shown in Table 1, wherein
the values of $\delta1$ and $\delta2$ are indicated by an index based on the value of $\delta1$ of Ref.1 being 100,
the values of $E^*1$ and $E^*2$ are indicated by an index based on the value of $E^*1$ of Ref.1 being 100,
the values of f2/f1 are indicated by an index based on the value of f1 of Ref.1 being 100,
the loss tangent $\delta1$ of the axially inner rubber layer of Ref.1 was 0.10,
the complex elastic modulus $E^*1$ of the axially inner rubber layer of Ref.1 was 20 MPa, and the adhesive force f1 of the axially inner rubber layer of Ref.1 was 150 N.

<Bead Durability Test>

Using a tire test drum, each test tire was run under the following conditions, and the running distance until the bead portion broke was measured.

The results are indicated in Table 1 by an index based on Comparative Example Ref.1 being 100, wherein the larger the numerical value, the better, the bead durability performance.

Rim size: 6.0 J
Internal pressure: 220 kPa
vertical tire load: 19.84 kN
Running speed: 20 km/h <Appearance Test>

The outer surface of the region of each test tire where the sidewall rubber or the clinch rubber was disposed was visually evaluated by a tester.

The results are indicated in Table 1 by an index based on Comparative Example Ref.1 being 100, wherein the larger the numerical value, the better the appearance.

TABLE 1

| Tire | Ref. 1 | Ref.2 | Ref.3 | Ref.4 | Ex. 1 | Ex.2 | Ex.3 | Ex.4 | Ex.5 |
|---|---|---|---|---|---|---|---|---|---|
| D1(mm) | 0 | 0 | 0 | 0 | 1.5 | 3 | 5 | 3 | 3 |
| D2(mm) | 0 | 0 | 0 | 0 | 1.5 | 3 | 5 | 3 | 3 |
| Ta(mm) | 3 | 3 | 3 | 3 | 3 | 3 | 3 | 3 | 3 |
| Tb(mm) | 1.5 | 1 | 1 | 1 | 1 | 1 | 1 | 1 | 1 |
| tan$\delta$1 | 100 | 100 | 80 | 80 | 80 | 80 | 80 | 80 | 80 |
| tan$\delta$2 | 100 | 100 | 100 | 130 | 100 | 100 | 100 | 100 | 100 |
| E*1 | 100 | 100 | 80 | 80 | 80 | 80 | 80 | 80 | 80 |
| E*2 | 100 | 100 | 100 | 130 | 100 | 100 | 100 | 100 | 100 |
| f2/f1 | 100 | 100 | 100 | 100 | 100 | 100 | 100 | 130 | 150 |
| Bead durability | 100 | 110 | 120 | 120 | 130 | 140 | 140 | 150 | 150 |
| Appearance | 100 | 100 | 100 | 100 | 110 | 110 | 110 | 110 | 110 |

From the test results, it was confirmed that Example tires according to the present disclosure had improved bead durability performance as compared to Comparative example tires, and maintained good appearance.

STATEMENT OF THE PRESENT DISCLOSURE

The present disclosure is as follows:

Disclosure 1: A pneumatic tire comprising:
a pair of bead portions each with a bead core embedded therein, and
a carcass extending between the bead portions, the carcass comprising a carcass ply extending between the bead portions and turned up around the bead core in each bead portion from the axially inside to the axially outside so as to form a pair of turnup portions extending radially outwardly, and a main portion therebetween, wherein
one of or each of the bead portions is provided with a reinforcing rubber portion disposed adjacently to the axially outer side of the turnup portion,
the reinforcing rubber portion includes an axially inner rubber layer, and an axially outer rubber layer which is adjacent to the axially outer side of the axially inner rubber layer,
the radially outer end of the axially outer rubber layer is positioned radially outside the radially outer end of the axially inner rubber layer, and
the radially inner end of the axially outer rubber layer is positioned radially inside the radially inner end of the axially inner rubber layer.

Disclosure 2: The pneumatic tire according to Disclosure 1, wherein
the distance D1 in the tire radial direction between the radially outer end of the axially inner rubber layer and the radially outer end of the axially outer rubber layer is 3 mm or more.

Disclosure 3: The pneumatic tire according to Disclosure 1, wherein
the distance D2 in the tire radial direction between the radially inner end of the axially inner rubber layer and the radially inner end of the axially outer rubber layer is 3 mm or more.

Disclosure 4: The pneumatic tire according to any one of Disclosures 1 to 3, wherein
the axially inner rubber layer and the axially outer rubber layer are made of sheet-shaped rubber members, and
the reinforcing rubber portion includes a first portion where the sheet-shaped rubber members are laminated, and
the first portion extends across a straight line drawn in parallel to the tire axial direction, passing through the radially outer end of a contact area between the pneumatic tire and a regular rim in a state of the tire which is mounted on the regular rim, and inflated to a standard pressure, but loaded with no tire load.

Disclosure 5: The pneumatic tire according to Disclosure 4, wherein
a thickest portion of the first portion exists on the straight line.

Disclosure 6: The pneumatic tire according to Disclosure 4 or 5, wherein
the reinforcing rubber portion includes a second portion where the sheet-shaped rubber members are not laminated, and
the difference (Ta−Tb) between the thickness Ta of the first portion and the thickness Tb of the second portion is 1 mm or more.

Disclosure 7: The pneumatic tire according to Disclosure 6, wherein
the thickness Ta of the first portion is 1.5 to 2.5 times the thickness Tb of the second portion.

Disclosure 8: The pneumatic tire according to any one of Disclosures 1 to 7, wherein
a loss tangent $\delta$2 of the axially outer rubber layer is greater than a loss tangent $\delta$1 of the axially inner rubber layer.

Disclosure 9: The pneumatic tire according to any one of Disclosures 1 to 8, wherein
a complex elastic modulus E*2 of the axially outer rubber layer is not less than 60% of a complex elastic modulus E*1 of the axially inner rubber layer.

Disclosure 10: The pneumatic tire according to Disclosure 9, wherein
the complex elastic modulus E*2 of the axially outer rubber layer is greater than the complex elastic modulus E*1 of the axially inner rubber layer.

Disclosure 11: The pneumatic tire according to any one of Disclosures 1 to 10, wherein
the axially outer rubber layer and the axially inner rubber layer each include a constant-thickness portion having a constant thickness.

Disclosure 12: The pneumatic tire according to any one of Disclosures 1 to 11, wherein an adhesive force of the axially outer rubber layer is not less than 1.3 times an adhesive force of the axially inner rubber layer.

DESCRIPTION OF THE REFERENCE SIGNS

1 Pneumatic tire
4 Bead portion
6A Carcass ply
10 Reinforcing rubber portion
11 Inner rubber layer
11e Radially outer end of Inner rubber layer
11i Radially inner end of Inner rubber layer
12 Outer rubber layer
12e Radially outer end of Outer rubber layer
12i Radially inner end of Outer rubber layer

The invention claimed is:

1. A pneumatic tire comprising:
a pair of bead portions each with a bead core embedded therein, and
a carcass extending between the bead portions through a tread portion and sidewall portions,
the carcass comprising a carcass ply extending between the bead portions and turned up around the bead core in each bead portion from the axially inside to the axially outside so as to form a pair of turnup portions extending radially outwardly, and a main portion therebetween, wherein
each of the bead portions is provided with a reinforcing rubber portion disposed adjacently to an axially outer side of the turnup portion,
the reinforcing rubber portion is composed of an axially inner rubber layer, and an axially outer rubber layer,
wherein
a loss tangent δ2 of the axially outer rubber layer is 0.07 or more and 0.20 or less,
a loss tangent δ1 of the axially inner rubber layer is not less than 50% and not more than 70% of the loss tangent δ2 of the axially outer rubber layer,
a complex elastic modulus E*2 of the axially outer rubber layer is 40 MPa or more and 150 MPa or less,
the complex elastic modulus E*2 of the axially outer rubber layer is not less than 120% and not more than 200% of a complex elastic modulus E*1 of the axially inner rubber layer,
wherein
the axially inner rubber layer is composed of
a radially outer reduced-thickness portion whose thickness decreases toward a radially outer end of the axially inner rubber layer,
a radially inner reduced-thickness portion whose thickness decreases toward a radially inner end of the axially inner rubber layer, and
a constant-thickness portion therebetween having a constant thickness, and
a length Lc of each of the radially outer and radially inner reduced-thickness portions is not more than 5 mm,
wherein
the axially outer rubber layer is composed of
a radially outer reduced-thickness portion whose thickness decreases toward a radially outer end of the axially outer rubber layer,
a radially inner reduced-thickness portion whose thickness decreases toward a radially inner end of the axially outer rubber layer, and
a constant-thickness portion therebetween having a constant thickness, and
a length Lc of each of the radially outer and radially inner reduced-thickness portions is not more than 5 mm,
wherein
the radially outer end of the axially outer rubber layer is positioned radially outside the radially outer end of the axially inner rubber layer, and
the radially inner end of the axially outer rubber layer is positioned radially inside the radially inner end of the axially inner rubber layer, and
the axially inner rubber layer and the axially outer rubber layer are in contact with each other from the radially outer end of the axially inner rubber layer to the radially inner end of the axially inner rubber layer,
wherein
an axially inner surface of the reinforcing rubber portion from its radially outer end to radially inner end is directly adjacent to the carcass ply turnup portion,
an axially outer surface of the reinforcing rubber portion from its radially outer end to radially inner end is directly adjacent to a sidewall rubber forming the outer surface of the tire in the sidewall portion and a clinch rubber forming the outer surface of the tire in the bead portion,
wherein
a complex elastic modulus E* of the sidewall rubber and a complex elastic modulus E* of the clinch rubber are smaller than the complex elastic modulus E*1 of the axially inner rubber layer; and
wherein the loss tangents and the complex elastic moduli are measured under the following conditions in accordance with the provisions of JIS-K6394:
initial strain: 10%
dynamic strain amplitude: +/−2%
frequency: 10 Hz
deformation mode: stretch
measurement temperature: 70° C.

2. The pneumatic tire according to claim 1, wherein
a distance D1 in the tire radial direction between the radially outer end of the axially inner rubber layer and the radially outer end of the axially outer rubber layer is in a range from 5 mm to 15 mm.

3. The pneumatic tire according to claim 2, wherein
a distance D2 in the tire radial direction between the radially inner end of the axially inner rubber layer and the radially inner end of the axially outer rubber layer is in a range from 3 mm to 10 mm.

4. The pneumatic tire according to claim 1, wherein
a first portion of the reinforcing rubber portion where the inner rubber layer and the outer rubber layer are in contact with each other, extends across a straight line drawn in parallel to the tire axial direction, passing through a radially outer end of a contact area between the pneumatic tire and a regular rim in a state of the tire which is mounted on the regular rim, and inflated to a standard pressure, but loaded with no tire load.

5. The pneumatic tire according to claim 2, wherein
a first portion of the reinforcing rubber portion where the inner rubber layer and the outer rubber layer are in contact with each other, extends across a straight line drawn in parallel to the tire axial direction, passing through a radially outer end of a contact area between the pneumatic tire and a regular rim in a state of the tire which is mounted on the regular rim, and inflated to a standard pressure, but loaded with no tire load.

6. The pneumatic tire according to claim 3, wherein
a first portion of the reinforcing rubber portion where the inner rubber layer and the outer rubber layer are in contact with each other, extends across a straight line drawn in parallel to the tire axial direction, passing through a radially outer end of a contact area between the pneumatic tire and a regular rim in a state of the tire which is mounted on the regular rim, and inflated to a standard pressure, but loaded with no tire load.

7. The pneumatic tire according to claim 4, wherein
the reinforcing rubber portion includes a second portion where the axially outer rubber layer exists, but the axially inner rubber layer does not exist, and
a difference (Ta−Tb) between a thickness Ta of the first portion and a thickness Tb of the second portion is 1 mm or more.

8. The pneumatic tire according to claim 7, wherein
the thickness Ta of the first portion is 1.5 to 2.5 times the thickness Tb of the second portion.

9. The pneumatic tire according to claim 1, wherein
an adhesive force of the axially outer rubber layer is not less than 1.3 times an adhesive force of the axially inner rubber layer.

10. The pneumatic tire according to claim 1, wherein
a height H1 in the tire radial direction of the radially outer end of the axially outer rubber layer from a bead baseline BL is in a range from 20% to 50% of a tire cross-sectional height H.

11. The pneumatic tire according to claim 10, wherein
the axially outer rubber layer extends from a position outside the bead core in the tire axial direction to a position in a vicinity of the radially outer end of the turnup portion of the carcass ply and radially inside the radially outer end of the turnup portion of the carcass ply.

12. The pneumatic tire according to claim 1, wherein
the carcass consists of said carcass ply as a first carcass ply and an additional carcass ply as a second carcass ply,
the second carcass ply extends between the bead portions, and turned up around the bead core in each bead portion from the axially inside to the axially outside so as to form a pair of turnup portions and a main portion therebetween,
the turnup portions of the second carcass ply are respectively positioned axially inside the turnup portions of the first carcass ply,
each of the bead portions is provided with a bead apex rubber between the turnup portion and the main portion of the second carcass ply, and
in each of the bead portions, the turnup portion of the second carcass ply extends radially outwardly beyond a radially outer end of the bead apex rubber and then extends abutting on the main portion of the second carcass ply.

13. The pneumatic tire according to claim 12, wherein
a complex elastic modulus $E*3$ of the bead apex rubber is equal to the complex elastic modulus $E*1$ of the axially inner rubber layer.

14. The pneumatic tire according to claim 13, wherein
the complex elastic modulus $E*3$ of the bead apex rubber is smaller than the complex elastic modulus $E*2$ of the axially outer rubber layer.

15. The pneumatic tire according to claim 1, wherein
a thickness T1 of the constant-thickness portion of the axially inner rubber layer is equal to a thickness T2 of the constant-thickness portion of the axially outer rubber layer.

16. The pneumatic tire according to claim 1, wherein
a thickness T2 of the constant-thickness portion of the axially outer rubber layer is larger than a thickness T1 of the constant-thickness portion of the axially inner rubber layer.

17. The pneumatic tire according to claim 16, wherein
the thickness T2 is 120% or more and 350% or less of the thickness T1.

18. The pneumatic tire according to claim 16, wherein
the thickness T2 is 0.5 mm or more and 2.0 mm or less.

19. The pneumatic tire according to claim 9, wherein
the adhesive force of the axially outer rubber layer is not more than 2.0 times the adhesive force of the axially inner rubber layer.

20. The pneumatic tire according to claim 19, wherein
the adhesive force of the axially outer rubber layer is 150N or more and 350N or less.

* * * * *